(12) United States Patent
Kozel et al.

(10) Patent No.: US 11,121,529 B2
(45) Date of Patent: Sep. 14, 2021

(54) SWITCHGEAR OR CONTROL GEAR

(71) Applicant: ABB Schweiz AG, Baden (CH)

(72) Inventors: Tomas Kozel, Brno (CZ); Radek Javora, Hrusovany u Brna (CZ); Josef Cernohous, Jamne nad Orlici (CZ)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/718,251

(22) Filed: Dec. 18, 2019

(65) Prior Publication Data
US 2020/0203934 A1 Jun. 25, 2020

(30) Foreign Application Priority Data

Dec. 19, 2018 (EP) .................................... 18213994

(51) Int. Cl.
*H02B 1/30* (2006.01)
*H02B 1/34* (2006.01)
(Continued)

(52) U.S. Cl.
CPC ............. *H02B 1/34* (2013.01); *H01H 33/027* (2013.01); *H02B 1/14* (2013.01); *H02B 1/202* (2013.01);
(Continued)

(58) Field of Classification Search
CPC ...... H02B 11/127; H02B 1/36; H02B 13/025; H02B 11/04; H02B 13/02; H02B 1/565;
(Continued)

(56) References Cited

U.S. PATENT DOCUMENTS 4,351,990 A * 9/1982 Hesselbart ........... H01H 33/022
200/50.22
4,528,614 A * 7/1985 Shariff ..................... H02B 1/36
165/104.33
(Continued)

FOREIGN PATENT DOCUMENTS

CN 204835269 U * 12/2015
CN 105655912 A 6/2016
(Continued)

OTHER PUBLICATIONS

English translation of the abstract in reference Zhong (Year: 2015).*
(Continued)

*Primary Examiner* — Mandeep S Buttar
(74) *Attorney, Agent, or Firm* — Leydig, Voit & Mayer, Ltd.

(57) ABSTRACT

A switchgear or control gear includes: at least one first compartment; at least one second compartment; a plurality of main switchgear or control gear components including a main busbar system, a three position linear or rotational movement disconnector, a circuit breaker, and at least a first part of an insulated cable connection; and a plurality of auxiliary switchgear or control gear components including a disconnector drive and a circuit breaker drive. The plurality of main switchgear or control gear components are housed in the at least one first compartment. The plurality of auxiliary switchgear or control gear components are housed in the at least one second compartment. When one or more of the plurality of main switchgear or control gear components is energized, the at least one first compartment is hermetically sealable or maintainable at an internal air pressure greater than ambient air pressure.

9 Claims, 2 Drawing Sheets

(51) Int. Cl.
*H01H 33/02* (2006.01)
*H02B 1/14* (2006.01)
*H02B 1/20* (2006.01)
*H02B 1/24* (2006.01)
*H02B 1/38* (2006.01)
*H02B 13/025* (2006.01)

(52) U.S. Cl.
CPC ............... *H02B 1/24* (2013.01); *H02B 1/38* (2013.01); *H02B 13/025* (2013.01)

(58) Field of Classification Search
CPC ... H02B 1/38; H02B 1/20; H02B 1/14; H02B 1/24; H02B 1/28; H02B 13/00; H02B 13/0352; H02B 1/34; H01H 9/22; H01H 33/027
USPC .................................. 361/605, 622, 724, 631
See application file for complete search history.

(56) References Cited

U.S. PATENT DOCUMENTS

| | | | |
|---|---|---|---|
| 10,218,158 B1 * | 2/2019 | Wiant | .................... H02B 1/202 |
| 2004/0017643 A1 | 1/2004 | Hartling et al. | |
| 2013/0318881 A1 | 12/2013 | Thompson et al. | |
| 2015/0338315 A1 * | 11/2015 | Manahan | ............ G01M 99/008 702/183 |
| 2017/0085064 A1 | 3/2017 | Cassimere et al. | |
| 2019/0081463 A1 * | 3/2019 | Bentley | ................ H02B 11/133 |
| 2019/0217734 A1 * | 7/2019 | Li | ............................ B60L 53/11 |

FOREIGN PATENT DOCUMENTS

| | | |
|---|---|---|
| CN | 208045958 U | 11/2018 |
| DE | 10120237 A1 | 10/2002 |
| EP | 3421190 A1 | 1/2019 |
| EP | 3422501 A1 | 1/2019 |
| EP | 3422502 A1 | 1/2019 |
| EP | 3422503 A1 | 1/2019 |
| RU | 2011138768 A | 2/2012 |
| WO | WO 2018222832 A1 | 12/2018 |

OTHER PUBLICATIONS

Siemens AG: "Circuit-Breaker Switchgear Type NXAIR and NXAIR P, up to 24 kV, Air-Insulated Medium-Voltage Switchgear Catalog HA 25.71.2012", Jan. 1, 2012 (Jan. 1, 2012), pp. 1-28, XP55583892.

* cited by examiner

SWITCHGEAR OR CONTROL GEAR

CROSS-REFERENCE TO RELATED APPLICATIONS

Priority is claimed to European Patent Application No. EP 18 213 994.9 filed on Dec. 19, 2018, the entire disclosure of which is hereby incorporated by reference herein.

FIELD

The present invention relates to switchgear or control gear for low voltage, medium voltage or high voltage use with a substation.

BACKGROUND

Autonomous substations or switchgear/control gear (or controlgear) systems require a robotic system for the whole substation in order to achieve a required level of autonomy. US 2017/0085064 A1 describes local equipment room (LER) for use in an industrial facility, having one or more robots to perform certain tasks, and LER being filled with non-atmospheric fluid or gas.

Such robotic systems operate with the substation or switchgear or control gear and perform both monitoring and maintenance tasks. Such robotic system can be quite complex and expensive, especially when considering variability existing in substations today. Even though robotic system can reduce maintenance tasks in a substation with respect to switchgear or control gear, the robot itself may require considerable maintenance. This can require the robot to be removed from the substation, switchgear or control gear or the personnel entering the substation, switchgear or control gear and thus leads to substation shut down.

There is a need to address this issue.

SUMMARY

In an embodiment, the present invention provides a switchgear or control gear, comprising: at least one first compartment; at least one second compartment; a plurality of main switchgear or control gear components comprising a main busbar system, a three position linear or rotational movement disconnector, a circuit breaker, and at least a first part of an insulated cable connection; and a plurality of auxiliary switchgear or control gear components comprising a disconnector drive and a circuit breaker drive, wherein the plurality of main switchgear or control gear components are housed in the at least one first compartment, wherein the plurality of auxiliary switchgear or control gear components are housed in the at least one second compartment, wherein when one or more of the plurality of main switchgear or control gear components is energized, the at least one first compartment is configured to be hermetically sealed or maintained at an internal air pressure greater than ambient air pressure and wherein when the plurality of main switchgear or control gear components are de-energized, the at least one first compartment is configured to enable an operator to access an interior of the at least one first compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
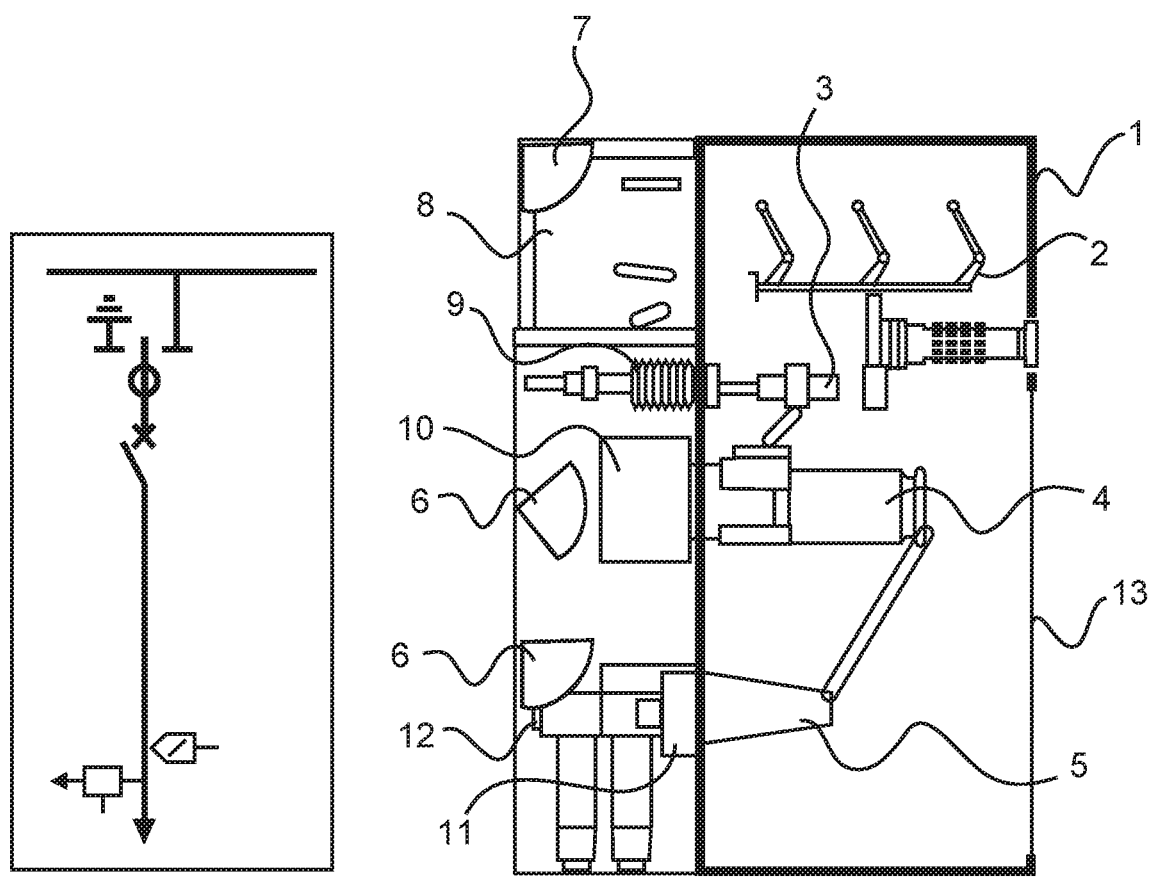
FIG. 1 shows an example of a switchgear or control gear.

Therefore, it would be advantageous to have means more easily to check switchgear and control gear functioning.

In a first aspect, there is provided a switchgear or control gear, comprising:

at least one first compartment;
at least one second compartment;
a plurality of main switchgear or control gear components; and
a plurality of auxiliary switchgear or control gear components.

The plurality of main switchgear or control gear components comprises a main busbar system, a three position linear or rotational movement disconnector, a circuit breaker, and at least a first part of an insulated cable connection. The plurality of auxiliary switchgear or control gear components comprises a disconnector drive and a circuit breaker drive. The plurality of main switchgear or control gear components are housed in the at least one first compartment. The plurality of auxiliary switchgear or control gear components are housed in the at least one second compartment. When one or more of the plurality of main switchgear or control gear components is energized the at least one first compartment is configured to be hermetically sealed or maintained at an internal air pressure greater than ambient air pressure. When the plurality of main switchgear or control gear components are de-energized the at least one first compartment is configured to enable an operator to access an interior of the at least one first compartment.

In an example, the at least one first compartment is arc proof.

In an example, the at least one first compartment complies with IP43 standards.

In an example, the at least one first compartment complies with IP54 standards.

In an example, the at least one first compartment is not configured to be filled with SF6 gas for operational purposes.

In an example, when the one or more of the plurality of main switchgear or control gear components is energized the at least one first compartment is not filled with SF6 gas.

In an example, the at least one first compartment comprises a plurality of first compartments. One compartment of the plurality of first compartments is a cable connection compartment within which is housed a second part of the insulated cable connection and a voltage sensor and a current sensor. The circuit breaker is housed in a first compartment other than the cable connection compartment.

In an example, at least one sensor is located in the cable connection compartment. The at least one sensor is configured to monitor the components in the cable connection compartment, In an example, a second part of the insulated cable connection and a voltage sensor and a current sensor are housed in the at least one second compartment.

In an example, at least one sensor is located in the at least one second compartment. The at least one sensor is configured to monitor the components in the at least one second compartment.

In an example, the main switchgear or control gear components comprises one or more of: an earthing switch, voltage indication, surge arrestor, UFES, IS-limitor, contactor, load-break switch, and fuse.

In an example, the at least one second compartment is open-sided.

In an example, the at least one first compartment comprises at least one door or removable wall section.

Figure 2:
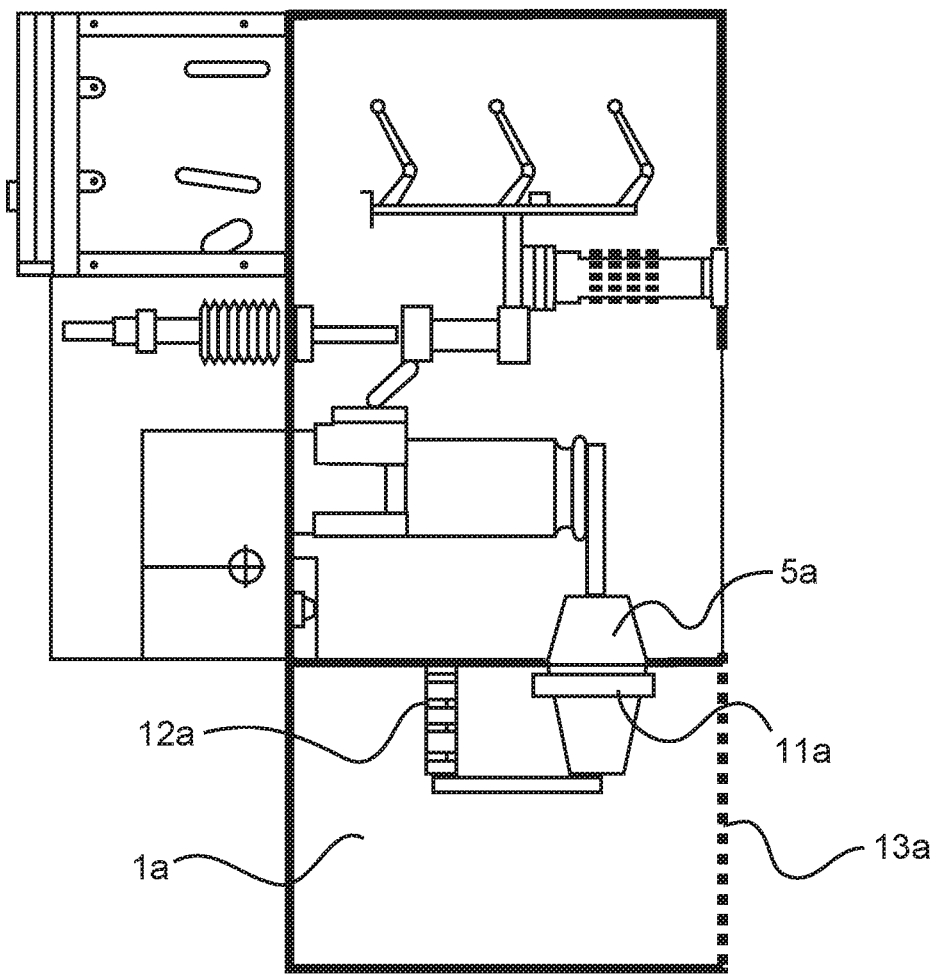
FIG. 2 shows an example of a switchgear or control gear.

FIGS. 1-2 show examples of a switchgear or control gear for operation in a low voltage, medium voltage or high voltage substation.

One example relates to a switchgear or control gear. The switchgear or control gear (also known as controlgear) comprises at least one first compartment 1, 1a, at least one second compartment 8, a plurality of main switchgear or control gear components, and a plurality of auxiliary switchgear or control gear components. The plurality of main switchgear or control gear components comprises a main busbar system 2, a three position linear or rotational movement disconnector 3, a circuit breaker 4, and at least a first part of an insulated cable connection 5, 5a. The plurality of auxiliary switchgear or control gear components comprises a disconnector drive 9 and a circuit breaker drive 10. The plurality of main switchgear or control gear components are housed in the at least one first compartment. The plurality of auxiliary switchgear or control gear components are housed in the at least one second compartment. When one or more of the plurality of main switchgear or control gear components is energized the at least one first compartment is configured to be hermetically sealed or maintained at an internal air pressure greater than ambient air pressure. When the plurality of main switchgear or control gear components are de-energized the at least one first compartment is configured to enable an operator to access an interior of the at least one first compartment.

According to an example, the at least one first compartment is arc proof.

According to an example, the at least one first compartment complies with IP43 standards.

According to an example, the at least one first compartment complies with IP54 standards.

According to an example, the at least one first compartment is not configured to be filled with SF6 gas for operational purposes.

According to an example, when the one or more of the plurality of main switchgear or control gear components is energized the at least one first compartment is not filled with SF6 gas.

According to an example, the at least one first compartment comprises a plurality of first compartments 1, 1a. One compartment of the plurality of first compartments is a cable connection compartment 1a within which is housed a second part of the insulated cable connection and a voltage sensor 12a and a current sensor 11a. The circuit breaker is housed in a first compartment 1 other than the cable connection compartment.

According to an example, at least one sensor 6, 7 is located in the cable connection compartment. The at least one sensor is configured to monitor the components in the cable connection compartment. This can be for example to monitor temperatures to detect overheating. The fields of view of the sensors are shown in FIG. 1.

According to an example, a second part of the insulated cable connection and a voltage sensor 12 and a current sensor 11 are housed in the at least one second compartment.

According to an example, at least one sensor 6, 7 is located in the at least one second compartment. The at least one sensor is configured to monitor the components in the at least one second compartment.

According to an example, the main switchgear or control gear components comprises one or more of: an earthing switch, voltage indication, surge arrestor, UFES, IS-limitor, contactor, load-break switch, and fuse.

According to an example, the at least one second compartment is open-sided.

According to an example, the at least one first compartment comprises at least one door or removable wall section 13, 13a. This is represented as part of the right hand wall of the enclosure 1 in FIG. 1, and as part of the right hand wall of enclosure 1a and as part of the right hand wall of enclosure 1 directly above 1a in FIG. 2.

Thus, a new substation development is provided that enables autonomous operation, i.e. with minimum personnel interaction required within an internal space of the substation. This is provided by hermetically enclosing the main switchgear functional components to prevent the ambient influence and thus limit to acceptable level the risk of failure of these. All auxiliaries are then arranged separately in a layout to support the safe access and simple monitoring by personnel. In other words, a non-robotic solution for a substation is provided, which can be used either on a whole substation or on some of its parts.

Continuing with the figures, specific features are now described. As discussed above the main functional parts of a switchgear or control gear are hermetically enclosed, preventing access to them during normal operation obviating the need of employing robotic system. Getting rid of the ambient environment effects on the main functional parts considerably prolongs the period they can function without maintenance.

FIG. 1 shows a detailed example of a switchgear or control gear, where for ease of reference the following features shown are listed:

1. Hermetically sealed and arc proof enclosure;
2. Main busbar system;
3. Three position disconnector;
4. Circuit breaker;
5. Insulated cable connection;
6 and 7. Sensors for monitoring, with the fields of views shown;
8. Low-voltage compartment with auxiliary circuits;
9. Disconnector drive;
10. Circuit breaker drive;
11. Current sensor;
12. Insulated cable connections including voltage sensors;
13. Part of the hermetically sealed enclosure, such as doors or removable part of the compartment, that can be used for human access in this situation when the switchgear or control gear or substation is fully de-energised.

Continuing with FIG. 1, the key components of the switchgear or control gear are enclosed in the hermetically sealed and arc proof enclosure. This mitigates malfunctions that can originate from the ambient environment. Thus, by preventing the external influence of ambient conditions on the current path insulation system the reliability of the key components can be improved. The risk of failure decreases to acceptable levels, and robotic maintenance is not required. The design is such, that the internal space containing the main functional parts is hermetically sealed, whereas all the auxiliary components remain outside the hermetic enclosure. The auxiliary components in the low-voltage compartment 8 also have a risk of failure but are now easily accessible without compromising the integrity of the hermetically sealed enclosure that contains the main functional components. FIG. 1 shows a linear three position disconnector switch, however a disconnector switch with rotational movement can be used instead.

In the situation when major refurbishment or failure of the main functional parts, the hermetically sealed and arc proof enclosure is still accessible for human personnel under the condition that all the switchgear or control gear main functional parts are de-energised. It is therefore to be noted, that the switchgear or control gear compartment/enclosure 1 is not required to be filled with SF6 gas.

Furthermore, by housing all the main functional parts in one enclosure the switchgear or control gear is not compartmentalized feeder by feeder as is normally done, rather all the main functional parts of all feeders on one common enclosure of the substation. This helps with thermal dissipation of the heat produced during the switchgear operation and allows efficient protection against internal arc with fast acting devices.

Because the hermetic sealing of the inner space does not have to be perfect, in that the enclosure is not SF6 gas filled, the enclosure need only conform to a minimum of IP54 standard in terms of protecting against dust and water. However, the inner space can be equipped with an air conditioning system that maintains a slight overpressure compared to the ambient, and in which case the enclosure need only conform to a minimum of IP43 standard.

The auxiliary components located outside of the hermetically sealed enclosure, located in the low-voltage compartment 8, and are arranged in a layout that enable simple replacement of monitoring with sensors. The low-voltage compartment 8 can be a fully contained space, but need not be in that one of the side walls can be open providing easy access without the need to remove a panel or open a door. The auxiliary devices or components are modularised the maintenance, and to simplify maintenance tasks, for example by replacing the removal modules.

FIG. 2 shows another detailed example of a switchgear or control gear. In this detailed example, for ease of reference the following features are listed:
  1*a*. Hermetically sealed and arc proof cable connection compartment;
  5*a*. Insulated cable connection/bushing;
  11*a*. Current sensor;
  12*a*. Cable connections including voltage sensors;
  13*a*. Part of the hermetically sealed enclosure, such as doors or removable part of the compartment, that can be used for human access when the cable connection of one feeder is de-energised.

Thus, in this example a cable compartment is permanently segregated from the common busbar and circuit breaker compartment. Fixed sensors might be installed in each compartment for monitoring, or all monitoring and maintenance tasks are done by human operators. This avoids the need for insulated cable terminations.

FIG. 1 shows access to cable connection from the front side, from the same side as the low voltage auxiliaries. However, as shown in FIG. 1 enabling the operator access from the rear side to the cable connections separating the front side (with low voltage auxiliaries) from the rear side (removable cover for access to medium voltage parts) helps with safety and access control aspects.

It is also to be noted that a circuit breaker pole design with primary connections on the pole side can be utilized instead of a pole with one top and one side primary connection. The primary connections on such pole would face upward or sideways.

The at least one sensor 6, 7 can include at least one camera, linked to an image recognition system.

In an example, the image recognition system is configured to evaluate actual images with adaptive image data, in order to be able to locate and to analyse physical reasons for faults or deterioration of components that might lead to faults.

In an example, the camera is provided with a video mode. In this way functional surveillance can be taken by slow motion video sequences. Thus, the image recognition system is configured to automatically the slow motion video sequences with regular expected function sequences through comparison of the slow motion video sequences from a adaptive data field, which show the expected regular function.

The at least one sensor 6, 7 can include a temperature sensing system and/or a temperature recognition system.

The at least one sensor 6, 7 can include an environmental sensing system configured to sense humidity, moisture or pressure, linked to an environment recognition system.

The at least one sensor 6, 7 can include a surface contamination sensing system and/or a surface contamination recognition system that can utilize other sensed quantities.

The at least one sensor 6, 7 can include an electrical discharge sensing system and/or an electrical discharge recognition system that can utilize other sensed quantities.

The at least one sensor 6, 7 is configured to communicate via a data network or an external data communication interface.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear or control gear, comprising:
   at least one first compartment;

at least one second compartment;

a plurality of main switchgear or control gear components comprising a main busbar system, a three position linear or rotational movement disconnector, a circuit breaker, and at least a first part of an insulated cable connection;

a plurality of auxiliary switchgear or control gear components comprising a disconnector drive and a circuit breaker drive; and at least one first sensor located in the at least one second compartment, wherein the plurality of main switchgear or control gear components are housed in the at least one first compartment, wherein the plurality of auxiliary switchgear or control gear components are housed in the at least one second compartment, wherein when one or more of the plurality of main switchgear or control gear components is energized, the at least one first compartment is configured to be hermetically sealed and conform to a minimum of an IP54 standard, or maintained at an internal air pressure greater than ambient air pressure and conform to a minimum of an IP43 standard, wherein the at least one first sensor is configured to monitor the plurality of auxiliary switchgear or control gear components housed in the at least one second compartment, and wherein when the plurality of main switchgear or control gear components are de-energized, the at least one first compartment is configured to enable an operator to access an interior of the at least one first compartment in that the at least one first compartment is not hermetically sealed and does not conform to the minimum of the IP54 standard, or is not maintained at the internal air pressure greater than ambient air pressure and does conform to the minimum of the IP43 standard.

2. The switchgear or control gear according to claim 1, wherein the at least one first compartment is arc proof.

3. The switchgear or control gear according to claim 1, wherein the at least one first compartment is not configured to be filled with $SF_6$ gas for operational purposes.

4. The switchgear or control gear according to claim 1, wherein when the one or more of the plurality of main switchgear or control gear components is energized, the at least one first compartment is not filled with $SF_6$ gas.

5. The switchgear according to claim 1, wherein the at least one first compartment comprises a plurality of first compartments, wherein a primary first compartment of the plurality of first compartments comprises a cable connection compartment within which is housed a second part of the insulated cable connection and a voltage sensor and a current sensor, and wherein the circuit breaker is housed in a secondary first compartment of the plurality of first compartments.

6. The switchgear according to claim 5, wherein at least one second sensor is located in the cable connection compartment, and wherein the at least one second sensor is configured to monitor the components in the cable connection compartment.

7. The switchgear or control gear according to claim 1, wherein a second part of the insulated cable connection and a voltage sensor and a current sensor are housed in the at least one second compartment.

8. The switchgear or control gear according to claim 1, wherein the at least one second compartment is open-sided.

9. The switchgear or control gear according to claim 1, wherein the at least one first compartment comprises at least one door or removable wall section.

* * * * *